March 29, 1938. P. E. HAWKINS 2,112,652
UTILITY TRUCK
Filed Oct. 19, 1935 3 Sheets-Sheet 1

INVENTOR.
PAUL E. HAWKINS.
BY Geo. B. Pitts
ATTORNEY.

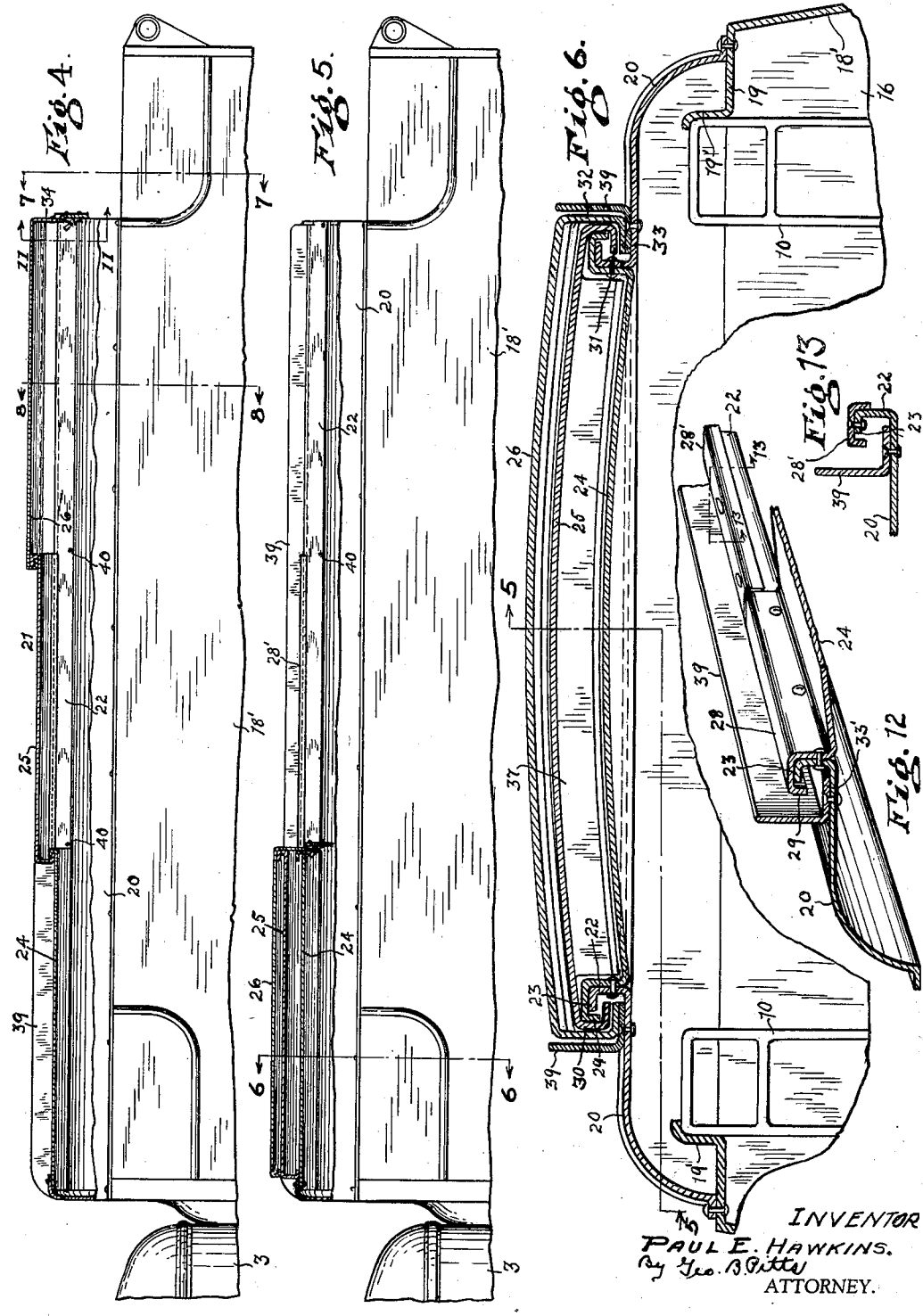

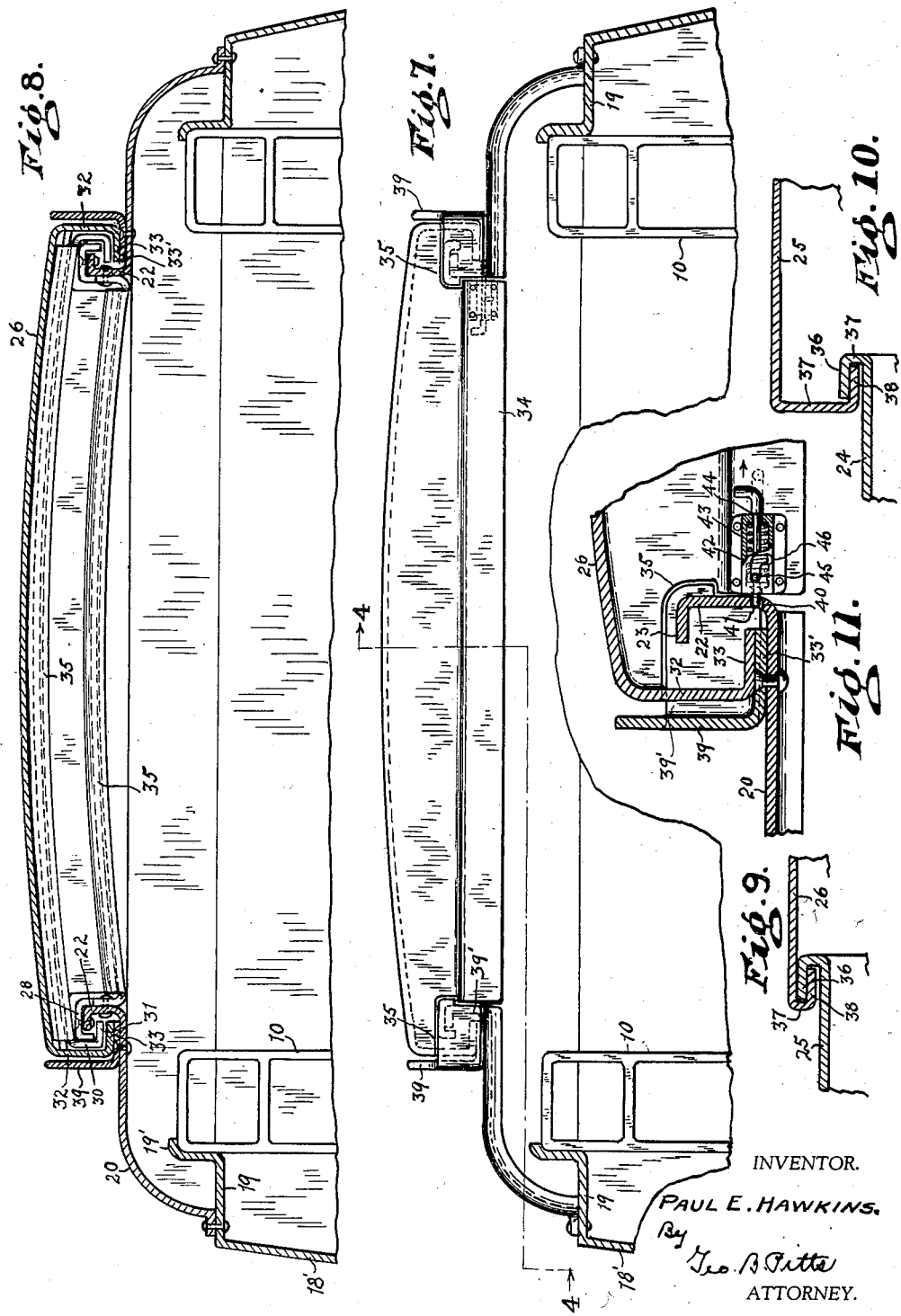

Patented Mar. 29, 1938

2,112,652

UNITED STATES PATENT OFFICE 2,112,652

UTILITY TRUCK

Paul E. Hawkins, Lakewood, Ohio, assignor to The Baker-Raulang Company, Cleveland, Ohio, a corporation of Ohio Application October 19, 1935, Serial No. 45,761

2 Claims. (Cl. 296—137)

This invention relates to a power driven truck of the utility type particularly adapted for use by electricians and linemen in removing, re-setting and installing poles for telephone and telegraph wires and current conductors, putting up and repairing overhead and underground conductors and wiring and other operations.

One object of the invention is to provide in a truck or vehicle an improved body having a sectional roof permitting a large portion thereof to be readily opened for various purposes, such as the erection of a derrick, poles or other equipment for carrying out various operations.

Another object of the invention is to provide in a truck or vehicle an improved body having a roof formed of relatively movable sections, which are simple and economical in construction and relatively light to permit of their easy operation, to provide an overhead opening at and extending inwardly from the rear end of the body.

Another object of the invention is to provide an improved body for a vehicle having a roof formed of a fixed section and sections which are mounted to slide relative to each other and the fixed section in a manner which reduces friction to a minimum and prevents damage to their walls or the paint thereon.

Other objects of the invention will be apparent to those skilled in the art to which my invention relates from the following description taken in connection with the accompanying drawings, wherein Fig. 1 is a side elevation of a truck embodying my invention, the roof being closed, but parts thereof being broken away.

Fig. 4 is a fragmentary sectional view of the line 4—4 of Fig. 7.

Fig. 5 is a fragmentary section on the line 5—5 of Fig. 6.

Fig. 6 is a section on the line 6—6 of Fig. 5.

Figure 1:
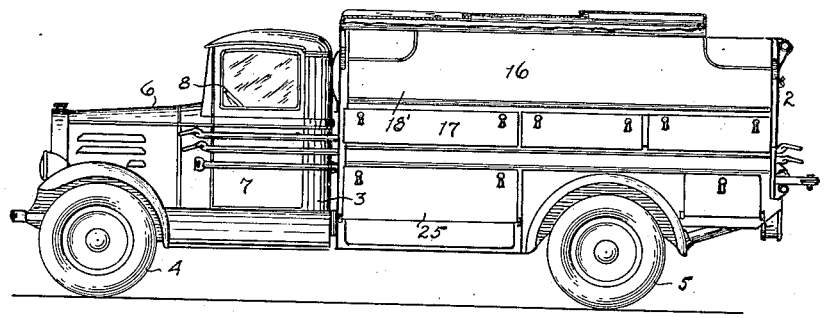
Figure 2:
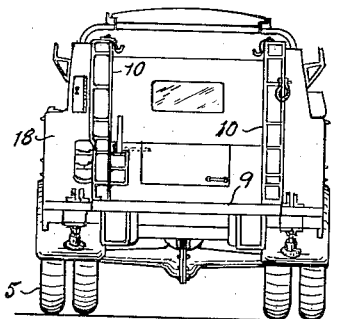
Fig. 2 is an end elevation.

Figs. 7 and 8 are sections on the lines 7—7 and 8—8, respectively, of Fig. 4.

Figs. 9 and 10 are fragmentary sections of parts shown in Fig. 4, enlarged.

Fig. 11 is a fragmentary section on the line 11—11 of Fig. 4.

Fig. 12 is a fragmentary perspective view illustrating certain details.

Fig. 13 is a section on the line 13—13 of Fig. 12.

In the drawings, 1 indicates as an entirety the truck comprising a body 2 and driver's cab 3 preferably mounted on a chassis having front steerable wheels 4 and rear driven wheels 5, but if desired the truck may consist of a tractor and detachable trailer. In the arrangement chosen for illustration, the power means is below and within the hood 6 and such means is drivingly connected to the wheels 5 in a well known manner. The cab 3 is preferably of the closed type and provided with doors 7 (only one being shown) and houses a suitable seat opposite a steering wheel 8. The doors 7 are provided with suitable windows which may be movably mounted in the door or removable therefrom.

The body 2 comprises a flooring 9 on which are mounted at either side thereof inwardly of its side edges a plurality of upright skeleton frame members 10, spaced longitudinally of the flooring. At either side, the flooring is provided with inverted boxes (not shown) to cover the wheels 5. I provide on the outer sides of each set of upright frame members 10, and extending from end to end of the body 2 upper and lower storing chambers 16, 17, having end walls 18. The upper chambers 16 preferably open into the interior of the body 2, whereas the lower chambers open exteriorly of the body 2 and are closed by doors 26, which are preferably hinged. The outer walls 18' of the upper chambers 16 are formed of sheet metal and at their upper portions they are extended inwardly to form the top walls 19 of these chambers, their marginal portions being bent upwardly, as shown at 19' and suitably secured to the outer side members of the frames 10.

The construction of the body as above set forth is preferably similar to that shown and described in my co-pending application, Serial No. 2,554, to which reference may be made, so that a fuller illustration and description herein is not required.

20 indicates a pair of upwardly and inwardly curved members extending longitudinally of the body and supported on and suitably secured along their outer edges to the top walls 19 and supporting on their inner edges a roof 21 formed of relatively movable sections. The inner horizontal portions of the members 20 form a support on which one roof section slides and their inner marginal portions are bent upwardly, as shown at 22 and laterally outwardly, or flanged as shown at 23, to form a support for the remaining roof sections.

Figure 3:
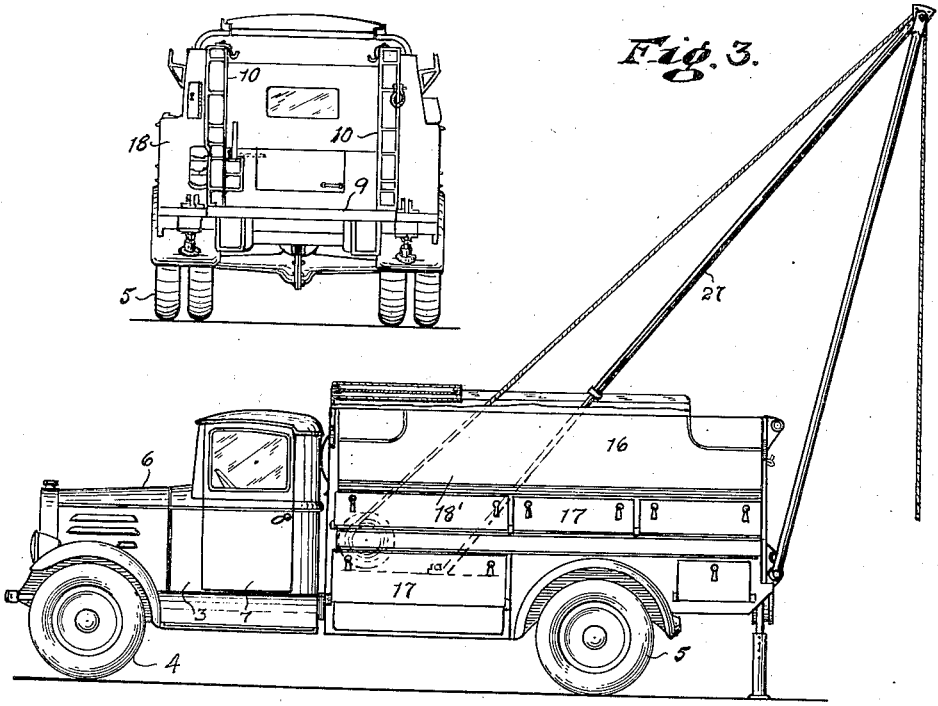
Fig. 3 is a view similar to Fig. 1, but showing the roof open (parts of the roof being broken away) and a derrick erected on the truck flooring.

The roof 21 comprises a stationary or fixed section 24 and a plurality of (preferably two) slidable sections 25, 26, which may move relative to each other and the stationary section 24 from their extended or closed position (Figs. 1 and 4)

to a position wherein they are disposed over the latter (Figs. 3 and 5); and these sections are formed of sheet metal to permit economical fabrication thereof and to provide lightness, whereby the slidable sections may be easily operated in either direction. In the arrangement shown, and to provide for the erection of a derrick 27 at the rear of the body as shown in Fig. 3, the stationary roof section 24 is arranged at the front end of the body and its opposite longitudinal sides are bent upwardly to fit between the vertical walls 22 (to which they may be suitably secured) and laterally at 28 to engage and rest on the flanges 23, their free edges being bent downwardly or flanged, as shown at 29, to protect the joint between them. The roof section 24 is slightly bowed between its opposite edges for drainage purposes. The front slidable section 25 is slightly bowed transversely substantially parallel to the section 24 to provide for its sliding engagement with the outer longitudinal edges of the walls 28 and channel rails 28', whereby the sliding contact between the section 25 and portions of the section 24 and rails 28' is reduced to a minimum. The rails 28' extend along the walls 23 rearward of the wall 28 to support the section 25 horizontally. The opposite side edges of the roof section 25 are provided with downwardly bent walls, as shown at 30, which may engage with the flanges 29 and the outer flanges of the rails 28', whereby the section 25 is guided in its endwise movement, and the walls 30 are provided with inturned flanges 31 to prevent intake of dirt and water, as well as to lock the section against upward movement and maintain it in sliding engagement with the walls 28, 28'. The rearmost slidable section 26 is also bowed substantially parallel to the sections 24 and 25 and is provided along its opposite sides with depending side walls 32 disposed on the outer sides of and guided by the side walls 30 of the section 25; and at their lower ends the side walls 32 are provided with inturned flanges 33 which slide on the inner horizontal portion of the members 20, or a rail or track 33' provided on the latter. The side walls 32 are of sufficient length to support the roof section 26 in spaced relation to the roof section 25. As the walls 33 extend under the walls 31 of the section 25, the section 26 is locked against upward movement and maintained in sliding engagement with the rails 33'. At its rear end, the section 26 is provided with an end wall 34, which is cut away at its opposite ends, as shown at 35, to accommodate the walls 22, 23, 30 and 31 when the section is slid forwardly. When the rearmost section is slid forwardly, the end wall 34 engages the rear end of the section 25 and is arrested thereby, unless the applied force is continued; in this latter event the wall 34 serves as a thrust member to slide the section 25 forwardly until the end wall 34 is stopped by the rear end of the roof section 24, as shown in Fig. 5. In this position the wall 34 closes the spaces between the sections to keep out dirt and water. The sections are provided along their adjoining transverse edges with interengaging overlapping walls which serve (a) to close the space between when the sections are in closed position, (b) to connect them together so that when moved from their open position to their closed position the sliding of the rearmost section 26 to its extreme position will effect a sliding of the intermediate section 25 and (c) to limit the rearward movement of the sections. As shown in Figs. 8, 9 and 10, each of the sections 24 and 25 is provided along its transverse rear end with an upstanding wall 35' and a forwardly extending wall 36 and each of the sections 25 and 26 is provided along its transverse forward end with a depending wall 37 and a rearwardly extending wall 38 which walls interengage with the walls 35' and 36 of the adjoining section, as shown in Figs. 4, 9 and 10. The guiding and supporting walls for the sections 24 and 25, are so arranged that during sliding movement of the sections 25 and 26, the wall 38 on one section does not contact with the adjacent section. 39 indicates a vertical wall extending along each member 20 outwardly of the adjacent side wall 32 of the member 26 from the rear end of the fixed section 24. The wall serves to cover the sides of the sections and to prevent intake of dust and water between the guiding and supporting walls thereof. Each wall 39 and the adjacent track 33' may be formed integrally by means of a metal wall bent at right angles, the inturned portion which forms the track 33', being riveted to the adjacent wall 20 (see Fig. 11). At its rear end, each wall 39 is provided with an inturned end wall to close the spaces between the walls 22, 23, 32, 33.

It will be noted that the roof sections are formed of sheet metal to insure lightness and that they are disposed in spaced relation and the slidable sections are independently supported along their opposite sides on relatively narrow surfaces, whereby the friction is reduced to a minimum. As a result the sections may be readily moved in either direction varying distances or to their extreme open and closed positions.

In the preferred arrangement, the roof sections when in closed position and side supporting members 20 terminate inwardly of the rear ends of the body sides and flooring 9 so that an operator may stand on the rear end portion of the flooring when the roof sections are closed and thus easily operate them when desired.

Provision is made for locking the roof sections in closed position or open position or the rearmost section in an intermediate position by providing in one wall 22 suitable openings 40 to receive a latch 41. The latch 41 consists of a rod endwise slidable and rotatable in the end walls of a casing 42. The rod 41 is provided with a collar against which a coiled spring 43 (mounted between the collar and outer end wall of the casing) normally acts to thrust the rod outwardly and maintain it in one of the openings 40 (see Fig. 11), such movement being limited by a shoulder 44 on the outer end portion of the rod, engaging the outer end wall of the casing. The rod 41 is provided with a laterally extending pin or lug 45 which extends through and traverses an angularly shaped slot 46 formed in the side wall of the casing 42, so that when the rod is moved endwise inwardly and rotated, as shown in dotted lines in Fig. 11, the rod 41 is held in an inoperative position.

To those skilled in the art to which my invention relates, many changes in construction and widely differing embodiments and applications of the invention will suggest themselves without departing from the spirit and scope of the invention. My disclosures and the description herein are purely illustrative and are not intended to be in any sense limiting.

What I claim is:

1. A vehicle body comprising a flooring, side members extending along either side of said body and forming an aisle between them and an opening at the rear end of said flooring, upwardly and inwardly extending rigid walls fixedly supported on and substantially co-extensive with said side members, the inner marginal edge of each of said walls terminating in a vertical portion having an outwardly extending flange arranged to form a horizontal guide, and a roof for the space between said walls consisting of a rigid section fixedly related to said vertical portions at the forward ends thereof, a rearward rigid section slidable on said guide flanges and having portions provided with inturned members extending thereunder, and a separate rigid section having depending side portions disposed outwardly of the lateral portions of said rearward section and provided with flanges extending inwardly below said inturned members of said rearward section for slidably supporting said separate section on said walls independently of said rearward section.

2. A vehicle body comprising a flooring, side members extending along either side of said body and forming an aisle between them and an opening at the rear end of said flooring, upwardly and inwardly extending rigid walls fixedly supported on and substantially co-extensive with said side members, the inner marginal edge of each of said walls terminating in a vertical portion having an outwardly extending flange arranged to form a horizontal guide, and a roof for the space between said walls consisting of a rigid section fixedly mounted on said walls at the forward ends thereof, a rearward rigid section slidable on said guide flanges and having portions provided with inturned members extending thereunder, and a separate rigid section having depending side portions disposed outwardly of the lateral portions of said rearward section and provided with flanges extending inwardly below said inturned members of said rearward section for slidably supporting said separate section on said walls independently of said rearward section, the rear end of said fixedly mounted section, the opposite ends of said rearward section and the forward end of said separate section being provided with inturned reversely related portions extending from side to side thereof and arranged to interengage when said sections are in normal or extended position to seal the joint between them.

PAUL E. HAWKINS.